US010944961B2

(12) United States Patent
Ciurea et al.

(10) Patent No.: US 10,944,961 B2
(45) Date of Patent: *Mar. 9, 2021

(54) SYSTEMS AND METHODS FOR DYNAMIC CALIBRATION OF ARRAY CAMERAS

(71) Applicant: FotoNation Limited, Galway (IE)

(72) Inventors: Florian Ciurea, Campbell, CA (US); Dan Lelescu, Morgan Hill, CA (US); Priyam Chatterjee, Sunnyvale, CA (US)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,347

(22) Filed: Apr. 1, 2019

(65) Prior Publication Data

US 2019/0230348 A1 Jul. 25, 2019

Related U.S. Application Data

(63) Continuation of application No. 15/515,489, filed as application No. PCT/US2015/053013 on Sep. 29, 2015, now Pat. No. 10,250,871.

(Continued)

(51) Int. Cl.
*H04N 17/00* (2006.01)
*G06T 7/80* (2017.01)
(Continued)

(52) U.S. Cl.
CPC .......... *H04N 17/002* (2013.01); *G06T 5/006* (2013.01); *G06T 7/80* (2017.01); *H04N 5/247* (2013.01);
(Continued)

(58) Field of Classification Search
CPC ...... H04N 17/002; H04N 5/247; G06T 5/006; G06T 7/80; G06T 2207/10052; G06T 2207/10012
(Continued)

(56) References Cited

U.S. PATENT DOCUMENTS

| 4,962,425 A | 10/1990 | Rea |
| 5,463,464 A | 10/1995 | Ladewski |

(Continued)

FOREIGN PATENT DOCUMENTS

| CN | 101593350 A | 12/2009 |
| CN | 103004180 A | 3/2013 |

(Continued)

OTHER PUBLICATIONS

Extended European Search Report for European Application No. 10832330.4, completed Sep. 26, 2013, dated Oct. 4, 2013, 7 pgs.

(Continued)

*Primary Examiner* — Lin Ye
*Assistant Examiner* — Chan T Nguyen
(74) *Attorney, Agent, or Firm* — KPPB LLP

(57) ABSTRACT

Systems and methods for dynamically calibrating an array camera to accommodate variations in geometry that can occur throughout its operational life are disclosed. The dynamic calibration processes can include acquiring a set of images of a scene and identifying corresponding features within the images. Geometric calibration data can be used to rectify the images and determine residual vectors for the geometric calibration data at locations where corresponding features are observed. The residual vectors can then be used to determine updated geometric calibration data for the camera array. In several embodiments, the residual vectors are used to generate a residual vector calibration data field that updates the geometric calibration data. In many embodi- (Continued)

ments, the residual vectors are used to select a set of geometric calibration from amongst a number of different sets of geometric calibration data that is the best fit for the current geometry of the camera array.

16 Claims, 6 Drawing Sheets

Related U.S. Application Data

(60) Provisional application No. 62/106,168, filed on Jan. 21, 2015, provisional application No. 62/057,196, filed on Sep. 29, 2014.

(51) Int. Cl.
  *G06T 5/00* (2006.01)
  *H04N 5/247* (2006.01)

(52) U.S. Cl.
  CPC ............ *G06T 2207/10012* (2013.01); *G06T 2207/10052* (2013.01)

(58) Field of Classification Search
  USPC ..................................... 348/218.1
  See application file for complete search history.

(56) References Cited

U.S. PATENT DOCUMENTS

| | | | |
|---|---|---|---|
| 5,757,425 A | 5/1998 | Barton et al. | |
| 6,095,989 A | 8/2000 | Hay et al. | |
| 6,373,518 B1 | 4/2002 | Sogawa | |
| 6,419,638 B1 | 7/2002 | Hay et al. | |
| 6,445,815 B1 | 9/2002 | Sato | |
| 6,477,260 B1 | 11/2002 | Shimomura | |
| 6,628,845 B1 | 9/2003 | Stone et al. | |
| 6,833,863 B1 | 12/2004 | Clemens | |
| 7,471,765 B2 | 12/2008 | Jaffray et al. | |
| 7,639,838 B2 | 12/2009 | Nims | |
| 8,416,282 B2 | 4/2013 | Lablans | |
| 8,559,705 B2 | 10/2013 | Ng | |
| 8,619,082 B1* | 12/2013 | Ciurea ................. H04N 13/232 345/427 |
| 8,831,377 B2 | 9/2014 | Pitts et al. | |
| 9,253,397 B2 | 2/2016 | Lee et al. | |
| 9,936,148 B2 | 4/2018 | McMahon | |
| 10,009,538 B2 | 6/2018 | Venkataraman et al. | |
| 10,019,816 B2 | 7/2018 | Venkataraman et al. | |
| 10,027,901 B2 | 7/2018 | Venkataraman et al. | |
| 10,089,740 B2 | 10/2018 | Srikanth et al. | |
| 10,091,405 B2 | 10/2018 | Molina | |
| 10,119,808 B2 | 11/2018 | Venkataraman et al. | |
| 10,122,993 B2 | 11/2018 | Venkataraman et al. | |
| 10,127,682 B2 | 11/2018 | Mullis | |
| 10,142,560 B2 | 11/2018 | Venkataraman et al. | |
| 10,182,216 B2 | 1/2019 | Mullis et al. | |
| 10,225,543 B2 | 3/2019 | Mullis | |
| 10,250,871 B2 | 4/2019 | Ciurea et al. | |
| 10,261,219 B2 | 4/2019 | Duparre et al. | |
| 10,275,676 B2 | 4/2019 | Venkataraman et al. | |
| 2002/0118113 A1 | 8/2002 | Oku et al. | |
| 2002/0171666 A1 | 11/2002 | Endo et al. | |
| 2003/0231179 A1 | 12/2003 | Suzuki | |
| 2006/0013318 A1 | 1/2006 | Webb et al. | |
| 2006/0187322 A1 | 8/2006 | Janson, Jr. et al. | |
| 2007/0166447 A1 | 7/2007 | Ur-Rehman et al. | |
| 2009/0066693 A1 | 3/2009 | Carson | |
| 2009/0092363 A1 | 4/2009 | Daum et al. | |
| 2009/0167923 A1 | 7/2009 | Safaee-Rad et al. | |
| 2009/0175349 A1 | 7/2009 | Ye et al. | |
| 2009/0273663 A1 | 11/2009 | Yoshida | |
| 2010/0053415 A1 | 3/2010 | Yun | |
| 2010/0085351 A1 | 4/2010 | Deb et al. | |
| 2010/0194860 A1 | 8/2010 | Mentz et al. | |
| 2010/0201809 A1 | 8/2010 | Oyama et al. | |
| 2011/0032341 A1 | 2/2011 | Ignatov et al. | |
| 2011/0150321 A1 | 6/2011 | Cheong et al. | |
| 2011/0199458 A1 | 8/2011 | Hayasaka et al. | |
| 2011/0211068 A1 | 9/2011 | Yokota | |
| 2011/0234825 A1 | 9/2011 | Liu et al. | |
| 2012/0013748 A1 | 1/2012 | Stanwood et al. | |
| 2012/0038745 A1 | 2/2012 | Yu et al. | |
| 2012/0163725 A1 | 6/2012 | Fukuhara | |
| 2013/0100254 A1 | 4/2013 | Morioka et al. | |
| 2013/0127988 A1 | 5/2013 | Wang et al. | |
| 2013/0135448 A1 | 5/2013 | Nagumo et al. | |
| 2013/0155050 A1 | 6/2013 | Rastogi et al. | |
| 2013/0162641 A1 | 6/2013 | Zhang et al. | |
| 2013/0222656 A1 | 8/2013 | Kaneko | |
| 2013/0286236 A1 | 10/2013 | Mankowski | |
| 2013/0308197 A1 | 11/2013 | Duparre | |
| 2013/0321581 A1 | 12/2013 | El-ghoroury et al. | |
| 2013/0342641 A1 | 12/2013 | Morioka et al. | |
| 2014/0059462 A1 | 2/2014 | Wernersson | |
| 2014/0081454 A1 | 3/2014 | Nuyujukian et al. | |
| 2014/0125771 A1* | 5/2014 | Grossmann ............. G06T 5/006 348/47 |
| 2014/0139642 A1 | 5/2014 | Ni et al. | |
| 2014/0139643 A1 | 5/2014 | Hogasten et al. | |
| 2014/0267633 A1* | 9/2014 | Venkataraman .......... G01P 3/38 348/48 |
| 2015/0235476 A1 | 8/2015 | McMahon et al. | |
| 2015/0264337 A1 | 9/2015 | Venkataraman et al. | |
| 2017/0188011 A1 | 6/2017 | Panescu et al. | |
| 2017/0244960 A1 | 8/2017 | Ciurea et al. | |
| 2018/0048879 A1 | 2/2018 | Venkataraman et al. | |
| 2018/0197035 A1 | 7/2018 | Venkataraman et al. | |
| 2018/0211402 A1 | 7/2018 | Ciurea et al. | |
| 2018/0227511 A1 | 8/2018 | McMahon | |
| 2018/0240265 A1 | 8/2018 | Yang et al. | |
| 2018/0270473 A1 | 9/2018 | Mullis | |
| 2018/0302554 A1 | 10/2018 | Lelescu et al. | |
| 2018/0330182 A1 | 11/2018 | Venkataraman et al. | |
| 2019/0037116 A1 | 1/2019 | Molina | |
| 2019/0037150 A1 | 1/2019 | Srikanth et al. | |
| 2019/0063905 A1 | 2/2019 | Venkataraman et al. | |
| 2019/0098209 A1 | 3/2019 | Venkataraman et al. | |
| 2019/0109998 A1 | 4/2019 | Venkataraman et al. | |

FOREIGN PATENT DOCUMENTS

| | | |
|---|---|---|
| CN | 104081414 B | 8/2017 |
| CN | 107077743 A | 8/2017 |
| CN | 104685513 B | 4/2018 |
| CN | 104335246 B | 9/2018 |
| DE | 602011041799.1 | 9/2017 |
| EP | 2502115 A2 | 9/2012 |
| EP | 2569935 A1 | 3/2013 |
| EP | 2777245 A1 | 9/2014 |
| EP | 2973476 A1 | 1/2016 |
| EP | 2569935 B1 | 12/2016 |
| EP | 3201877 A1 | 8/2017 |
| EP | 3201877 A4 | 3/2018 |
| EP | 3075140 B1 | 6/2018 |
| EP | 3201877 B1 | 12/2018 |
| EP | 3467776 A1 | 4/2019 |
| JP | 02-285772 A | 11/1990 |
| JP | 06129851 A | 5/1994 |
| JP | 09171075 A | 6/1997 |
| JP | 10253351 A | 9/1998 |
| JP | 11325889 A | 11/1999 |
| JP | 2002250607 A | 9/2002 |
| JP | 2005341569 A | 12/2005 |
| JP | 2008172735 A | 7/2008 |
| JP | 2009064421 A | 3/2009 |
| JP | 2010139288 A | 6/2010 |
| JP | 2011203238 A | 10/2011 |
| JP | 2012504805 A | 2/2012 |
| JP | 2013509022 A | 3/2013 |
| JP | WO2011052064 A1 | 3/2013 |
| JP | 5848754 B2 | 1/2016 |
| JP | 2016524125 A | 8/2016 |
| KR | 101843994 B1 | 3/2018 |

(56) References Cited

FOREIGN PATENT DOCUMENTS

| | | |
|---|---|---|
| TW | 201228382 A | 7/2012 |
| TW | I535292 B | 5/2016 |
| WO | 2010037512 A1 | 4/2010 |
| WO | 2011026527 A1 | 3/2011 |
| WO | 2011046607 A2 | 4/2011 |
| WO | 2015183824 A1 | 12/2015 |

OTHER PUBLICATIONS

Extended European Search Report for European Application No. 18205326.4, Search completed Jan. 8, 2019, dated Jan. 18, 2019, 9 Pgs.
International Preliminary Report on Patentability for International Application PCT/US2015/032467, Report issued Nov. 29, 2016, dated Dec. 8, 2016, 9 Pgs.
International Search Report and Written Opinion for International Application No. PCT/US2015/032467, Search completed Jul. 27, 2015, dated Aug. 19, 2015, 10 Pgs.

\* cited by examiner

SYSTEMS AND METHODS FOR DYNAMIC CALIBRATION OF ARRAY CAMERAS

FIELD OF THE INVENTION

The present application relates generally to camera arrays and more specifically to the dynamic calibration of an array of cameras.

BACKGROUND

Binocular viewing of a scene creates two slightly different images of the scene due to the different fields of view of each eye. These differences, referred to as binocular disparity (or parallax), provide information that can be used to calculate depth in the visual scene, providing a major means of depth perception. The impression of depth associated with stereoscopic depth perception can also be obtained under other conditions, such as when an observer views a scene with only one eye while moving. The observed parallax can be utilized to obtain depth information for objects in the scene. Similar principles in machine vision can be used to gather depth information.

Two cameras separated by a distance can take pictures of the same scene and the captured images can be compared by shifting the pixels of two or more images to find parts of the images that match. The amount an object shifts between two different camera views is called the disparity, which is inversely proportional to the distance to the object. A disparity search that detects the shift of an object in the multiple images that results in the best match can be used to calculate the distance to the object based upon the baseline distance between the cameras and the focal length of the cameras involved (as well as knowledge of additional properties of the camera). In most camera configurations, finding correspondence between two or more images requires a search in two dimensions. However, rectification can be used to simplify disparity searches. Rectification is a transformation process that can be used to project two or more images onto a common image plane. When rectification is used to project a set of images onto the same plane, disparity searches become one dimensional searches along epipolar lines.

More recently, researchers have used multiple cameras spanning a wider synthetic aperture to capture light field images (e.g. the Stanford Multi-Camera Array). A light field, which is often defined as a 4D function characterizing the light from all directions at all points in a scene, can be interpreted as a two-dimensional (2D) collection of 2D images of a scene. Due to practical constraints, it is typically difficult to simultaneously capture the collection of 2D images of a scene that form a light field. However, the closer in time at which the image data is captured by each of the cameras, the less likely that variations in light intensity (e.g. the otherwise imperceptible flicker of fluorescent lights) or object motion will result in time dependent variations between the captured images. Processes involving capturing and resampling a light field can be utilized to simulate cameras with large apertures. For example, an array of M×N cameras pointing at a scene can simulate the focusing effects of a lens whose field of view is as large as that of the array. In many embodiments, cameras need not be arranged in a rectangular pattern and can have configurations including circular configurations and/or any arbitrary configuration appropriate to the requirements of a specific application. Use of camera arrays in this way can be referred to as synthetic aperture photography.

SUMMARY OF THE INVENTION

Systems and methods in accordance with various embodiments of the invention perform dynamic calibration of camera arrays. One embodiment includes: acquiring a set of images of a scene using a plurality of cameras, where the set of images includes a reference image and an alternate view image; detecting features in the set of images using a processor directed by an image processing application; identifying within the alternate view image features corresponding to features detected within the reference image using a processor directed by an image processing application; rectifying the set of images based upon a set of geometric calibration data using a processor directed by an image processing application; determining residual vectors for geometric calibration data at locations where features are observed within the alternate view image based upon observed shifts in locations of features identified as corresponding in the reference image and the alternate view image using a processor directed by an image processing application; determining updated geometric calibration data for a camera that captured the alternate view image based upon the residual vectors using a processor directed by an image processing application; and rectifying an image captured by the camera that captured the alternate view image based upon the updated geometric calibration data using a processor directed by an image processing application.

In a further embodiment, determining residual vectors for geometric calibration data at locations where features are observed within the alternate view image includes: estimating depths of features within the alternate view image identified as corresponding to features detected within the reference image based upon components of the observed shifts in locations of features identified as corresponding in the reference image and the alternate view image along epipolar lines; determining scene dependent geometric corrections to apply to the observed shifts in locations of features identified as corresponding in the reference image and the alternate view image based upon the estimated depths of the corresponding features; and applying the scene dependent geometric corrections to the observed shifts in locations of features identified as corresponding in the reference image and the alternate view image to obtain residual vectors for geometric calibration data at locations where features are observed within the alternate view image.

In another embodiment, determining updated geometric calibration data for a camera that captured the alternate view image based upon the residual vectors includes using at least an interpolation process to generate a residual vector calibration field from the residual vectors.

In a still further embodiment, determining updated geometric calibration data for a camera that captured the alternate view image based upon the residual vectors further includes using an extrapolation process in the generation of the residual vector calibration field from the residual vectors.

Still another embodiment also includes applying the residual vector calibration field to the set of geometric calibration data with respect to the camera that captured the alternate view image.

A yet further embodiment also includes: mapping the residual vector calibration field to a set of basis vectors; and generating a denoised residual vector calibration field using a linear combination of less than the complete set of basis vectors.

In yet another embodiment, the set of basis vectors is learned from a training data set of residual vector calibration fields.

In a further embodiment again, the set of basis vectors is learned from a training data set of residual vector calibration fields using Principal Component Analysis.

In another embodiment again, determining updated geometric calibration data for a camera that captured the alternate view image further includes selecting an updated set of geometric calibration data from amongst a plurality of sets of geometric calibration data based upon at least the residual vectors for geometric calibration data at locations where features are observed within the alternate view image.

A further additional embodiment also includes: acquiring an additional set of images of a scene using the plurality of cameras; and determining residual vectors for the geometric calibration data using the additional set of images. In addition, determining updated geometric calibration data for a camera that captured the alternate view image based upon the residual vectors also includes utilizing the residual vectors for the geometric calibration data determined using the additional set of images.

Another additional embodiment also includes detecting at least one region within a field of view of a camera that does not satisfy a feature density threshold. In addition, the additional set of images of a scene is acquired in response to detecting that at least one region within a field of view of a camera does not satisfy the feature density threshold.

In a still yet further embodiment, utilizing the residual vectors determined using the additional set of images further includes utilizing the residual vectors determined using the additional set of images to determine updated geometric calibration data with respect to the at least one region within the field of view of the camera in which the density threshold was not satisfied.

Still yet another embodiment also includes providing prompts via a user interface using a processor directed by an image processing application, where the prompts direct orientation of the camera array to shift locations of features identified as corresponding in the reference image and the alternate view image into the at least one region within the field of view of a camera that does not satisfy a feature density threshold during acquisition of the additional set of images.

A still further embodiment again includes: acquiring a set of images of a scene using a plurality of cameras, where the set of images includes a reference image and an alternate view image; detecting features in the set of images using a processor directed by an image processing application; identifying within the alternate view image features corresponding to features detected within the reference image using a processor directed by an image processing application; rectifying the set of images based upon a set of geometric calibration data using a processor directed by an image processing application; and determining the validity of the geometric calibration data based upon observed shifts in locations of features identified as corresponding in the reference image and the alternate view image using a processor directed by an image processing application.

In still another embodiment again, determining the validity of the geometric calibration data based upon observed shifts in locations of features identified as corresponding in the reference image and the alternate view image includes determining the extent to which observed shifts are to locations distant from an epipolar line.

A yet further embodiment again also includes dynamically generating updated geometric calibration data by: determining residual vectors for geometric calibration data at locations where features are observed within the alternate view image based upon the observed shifts in locations of features identified as corresponding in the reference image and the alternate view image using a processor directed by an image processing application; and determining updated geometric calibration data for a camera that captured the alternate view image based upon the residual vectors using a processor directed by an image processing application.

In yet another embodiment again, determining residual vectors for geometric calibration data at locations where features are observed within the alternate view image includes: estimating depths of features within the alternate view image identified as corresponding to features detected within the reference image based upon components of the observed shifts in locations of features identified as corresponding in the reference image and the alternate view image along epipolar lines using a processor directed by an image processing application; determining scene dependent geometric corrections to apply to the observed shifts in locations of features identified as corresponding in the reference image and the alternate view image based upon the estimated depths of the corresponding features; and applying the scene dependent geometric corrections to the observed shifts in locations of features identified as corresponding in the reference image and the alternate view image to obtain residual vectors for geometric calibration data at locations where features are observed within the alternate view image.

In a still further additional embodiment, determining updated geometric calibration data for a camera that captured the alternate view image based upon the residual vectors includes using at least an interpolation process to generate a residual vector calibration field from the residual vectors.

In still another additional embodiment, determining updated geometric calibration data for a camera that captured the alternate view image further includes selecting an updated set of geometric calibration data from amongst a plurality of sets of geometric calibration data based upon at least the residual vectors for geometric calibration data at locations where features are observed within the alternate view image.

A yet further additional embodiment also includes: acquiring an additional set of images of a scene using the plurality of cameras; and determining residual vectors using the additional set of images. In addition, determining updated geometric calibration data for a camera that captured the alternate view image based upon the residual vectors also includes utilizing the residual vectors determined using the additional set of images.

Another further embodiment includes: at least one array of cameras comprising a plurality of cameras; a processor; and memory containing an image processing application. In addition, the image processing application directs the processor to: acquire a set of images of a scene using the plurality of cameras, where the set of images includes a reference image and an alternate view image; detect features in the set of images; identify within the alternate view image features corresponding to features detected within the reference image; rectify the set of images based upon a set of geometric calibration data; determine residual vectors for geometric calibration data at locations where features are observed within the alternate view image based upon observed shifts in locations of features identified as corresponding in the reference image and the alternate view image; determine updated geometric calibration data for a camera that captured the alternate view image based upon the residual vectors; and rectify an image captured by the camera that captured the alternate view image based upon the updated geometric calibration data.

DETAILED DESCRIPTION

Figure 1:
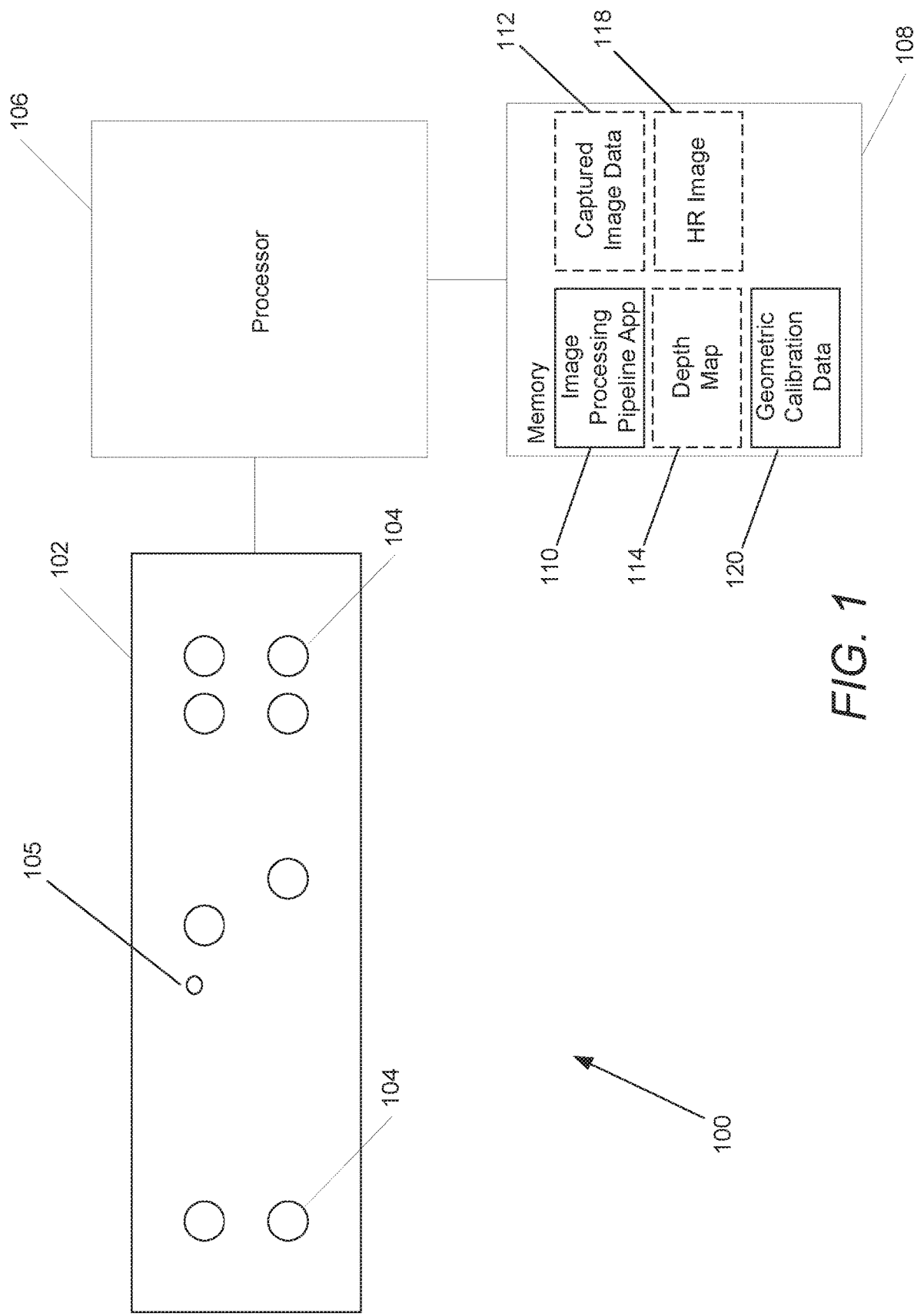
FIG. 1 conceptually illustrates a camera array in accordance with an embodiment of the invention.

Turning now to the drawings, systems and methods for dynamically calibrating camera arrays in accordance with embodiments of the invention are illustrated. Multi-camera systems are increasingly gaining popularity for various applications and their correct functionality depends on an ability to precisely register images captured by the cameras with respect to each other. The complexity of registering the various images to each other is reduced significantly by rectifying the images. This usually relies on an offline calibration process to capture information concerning the scene independent shifts of corresponding pixels that are introduced by the cameras in the array as a result of their construction (e.g. manufacturing variations in lens characteristics and/or in camera assembly), relative positions, and orientations (often referred to as the geometry of the array). In reality, the mechanical structures to which cameras in an array are mounted respond differently to various factors such as (but not limited to) temperature variations, and/or field conditions such as mechanical shock. Unless changes in the relative positions of the cameras in a camera array are accounted for, the changes can affect the registration of images captured by the cameras leading to degradation of depth estimates and/or images generated from image data captured by the cameras in the camera array (e.g. images produced by super-resolution, and/or images produced by applying a depth based filter or effect). Systems and methods in accordance with various embodiments of the invention can assess the geometric calibration of an array of cameras and perform an adaptive adjustment of geometric calibration by robust feature matching in any imaged scene. Assuming gradual degradation of geometric calibration from previously calibrated values, the redundancy of cameras within camera arrays in accordance with many embodiments of the invention can be exploited to determine new calibrated parameters and/or adjustments to existing calibration parameters that account for the new geometric relationships between the cameras.

In many embodiments, feature matching is utilized to identify a camera array for which existing calibration data is no longer valid. Features of real world scenes can be identified in each of a set of images captured by the cameras in an array. When the geometric calibration of the cameras correctly rectifies the images, corresponding features will be located on epipolar lines (assuming rectified images) at locations determined based upon the distance of the feature from the camera array. When the geometric relationships between the cameras in the array change and the calibration data is no longer valid, corresponding features will not be located within the images in the locations that would be predicted based upon epipolar line shifts consistent with a particular depth. Accordingly, differences between the actual and expected absolute, or relative to each other, locations of corresponding features within a set of images rectified using geometric calibration data can be utilized to identify when geometric calibration data is no longer valid. Furthermore, the differences can be used to dynamically generate new geometric calibration data and/or updates to geometric calibration data that can be utilized by the array of cameras to perform subsequent image processing operations such as (but not limited to) depth estimation and/or super-resolution processing.

Systems and methods in accordance with many embodiments of the invention can utilize corresponding features within a set of images to perform dynamic calibration when the changes in the geometry of the camera array impact the intrinsic parameters of the cameras in the camera array (i.e. the parameters that relate pixel coordinates of an image point with the corresponding coordinates in a camera's reference frame). The intrinsic parameters of a camera are typically thought to include the focal length, pixel skew, lens distortion parameters, and principal point of the camera. In several embodiments, dynamic calibration can also accommodate transformations in the extrinsic parameters of the camera array involving translations of the cameras along baselines defined relative to a reference camera. The extrinsic parameters of a camera are the parameters that define the location and orientation of the camera reference frame with respect to a known world reference frame. In the case of a camera array, extrinsic parameters are often defined relative to a reference camera. Translations that are not constrained to these baselines and/or changes in orientation of cameras may require performance of additional calibration processes to obtain updated geometric calibration data.

The process of dynamically generating updated geometric calibration data utilizes features that are identified throughout the field of view of a camera used as a reference camera during the dynamic calibration process. A challenge that can be faced in dynamic calibration processes is that many real world scenes include regions that are devoid of features (e.g. a white wall). In several embodiments, repeating the dynamic calibration process utilizing multiple different cameras in the camera array as the reference camera can further refine geometric calibration data. In this way, features from different portions of the fields of view of the cameras can be utilized to evaluate correspondence. In various embodiments, a complete set of geometric calibration data can be constructed using multiple sets of images captured at different points in time. By using multiple sets, geometric calibration data for a region in the field of view of a reference camera can be selected based upon the set of images in which the largest number of features and/or a density of features exceeding a threshold is present within the specific region. The geometric calibration data generated from the multiple sets of images can then be combined to create a set of geometric calibration data that covers the entire field of view of each camera. In a number of embodiments, the dynamic calibration process is guided. A user interface generated by the camera array can direct a user to change the orientation of the camera array so that movement of the camera array causes features detected in a first region of a first image to appear in a second region of a second image. In this way, the camera array can rapidly build a complete set of dynamic calibration data over time with respect to the entire field of view of the reference camera.

In certain embodiments, different sets of geometric calibration data are utilized to determine correspondences and the set of geometric calibration data that yields the best fit for the observed corresponding features is utilized to perform image processing. In this way, an array of cameras can be provided with various sets of geometric calibration data corresponding to, for example, different operating conditions and the geometric calibration data that yields the best fit for observed scene features can be utilized for image processing.

Systems and methods for validating geometric calibration data and dynamically calibrating arrays of cameras in accordance with various embodiments of the invention are discussed further below.

Array Cameras

Array cameras including camera modules that can be utilized to capture image data from different viewpoints (i.e. light field images) can be one dimensional, two dimensional (2D), monolithic, non-monolithic, arrayed in a grid, arrayed in a non-grid arrangement, and/or combine cameras having different imaging characteristics including (but not limited to) different resolutions, fields of view, and/or color filters. Various array camera architectures are disclosed in U.S. Pat. No. 9,077,893 entitled "Capturing and Processing of Images using Non-Grid Camera Arrays" to Venkataraman et al., U.S. Patent Publication No. 2015/0122411 entitled "Methods of Manufacturing Array Camera Modules Incorporating Independently Aligned Lens Stacks" to Rodda et al., U.S. Patent Publication No. 2015/0161798 entitled "Array Cameras Including an Array Camera Module Augmented with a Separate Camera", to Venkataraman et al., and U.S. Provisional Application Ser. No. 62/149,636 entitled "Multi-Baseline Camera Array System Architecture for Depth Augmentation in VR/AR Applications" to Venkatarman et al. Each two-dimensional (2D) image in a captured light field is from the viewpoint of one of the cameras in the array camera. Due to the different viewpoint of each of the cameras, parallax results in variations in the position of objects within the images of the scene. The disclosures of U.S. Pat. No. 9,077,893, U.S. Patent Publication Nos. 2015/0122411 and 2015/0161798, and U.S. Provisional Patent Application Ser. No. 62/149,636 that relate to the implementation and use of various camera array architectures are hereby incorporated by reference in their entirety.

In many embodiments, an array of cameras is utilized to capture a set of images of a scene and depth is estimated by performing disparity searches using the captured set of images. Depth estimates can be unreliable where regions along an epipolar line are self-similar. With each increase in the number of different epipolar lines searched (i.e. different baselines between pairs of cameras), the likelihood that texture is self-similar at each of the corresponding locations along the epipolar lines corresponding to an incorrect depth decreases. In a number of embodiments, projected texture is also utilized to decrease the self-similarity of different regions of a scene.

Array cameras can use disparity between pixels in images within a light field to generate a depth map from a reference viewpoint. A depth map indicates the distance of the surfaces of scene objects from the reference viewpoint and can be utilized to determine scene dependent geometric corrections to apply to the pixels from each of the images within a captured light field to eliminate disparity when performing fusion and/or super-resolution processing. Processes such as those disclosed in U.S. Pat. No. 8,619,082 entitled "Systems and Methods for Parallax Detection and Correction in Images Captured Using Array Cameras that Contain Occlusions using Subsets of Images to Perform Depth Estimation" to Ciurea et al. can be utilized to generate depth maps based upon observed disparity. The disclosure of U.S. Pat. No. 8,619,082 is hereby incorporated by reference in its entirety.

As noted above, geometric calibration data can be utilized to rectify a set of images so that corresponding pixels in the set of rectified images are located on epipolar lines. Geometric calibration data assumes a specific geometric configuration of the cameras in an array. If thermal and/or environmental factors cause the cameras in the array to change characteristics or shift positions relative to each other, then the assumptions underlying the geometric calibration data are no longer valid. Accordingly, the camera array must be recalibrated or potentially suffer serious degradation in the depth estimates generated using processes similar to those described in U.S. Pat. No. 8,619,082.

In many instances, fusion and super-resolution processes such as those described in U.S. Pat. No. 8,878,950 entitled "Systems and Methods for Synthesizing High Resolution Images Using Super-Resolution Processes" to Lelescu et al., can be utilized to synthesize a higher resolution 2D image or a stereo pair of higher resolution 2D images from the lower resolution images in the light field captured by a camera array. The terms high or higher resolution and low or lower resolution are used here in a relative sense and not to indicate the specific resolutions of the images captured by the array camera. As can readily be appreciated from a review of U.S. Pat. No. 8,878,950, fusing image data captured by an array camera and performing super-resolution processing is particularly dependent upon accurate geometric calibration data as the super-resolution processes are attempting to align pixels captured from different viewpoints with sub-pixel accuracy. Accordingly, super-resolution processes can be significantly enhanced by detecting that geometric calibration data is no longer valid and performing dynamic calibration of a camera array. The disclosure of U.S. Pat. No. 8,878,950 regarding super-resolution processing and the use of geometric calibration data to perform super-resolution processing is hereby incorporated by reference in its entirety.

An array camera that can be utilized in a variety of applications including (but not limited to) augmented reality headsets and machine vision systems in accordance with various embodiments of the invention is illustrated in FIG. 1. The array camera 100 includes an array camera module 102 with an array of individual cameras 104. The term array camera module 102 collectively refers to the mechanical structures that support the array of individual cameras and the cameras mounted to the mechanical structures. The array of individual cameras is a plurality of cameras in a particular arrangement, such as (but not limited to) the arrangement utilized in the illustrated embodiment incorporating a pair of vertically aligned cameras on the left-hand-side of the array, a staggered pair in the center of the array and four cameras in a grind on the right-hand-side of the array. In other embodiments, any of a variety of grid or non-grid arrangements of cameras can be utilized. In many embodiments, the array camera module also includes a projector 105 that can be utilized to project texture onto a scene to aid with depth estimation in regions of the scene that lack texture or are self-similar. The array camera module 102 is connected to the processor 106. The processor is also configured to communicate with one or more different types of memory 108 that can be utilized to store an image processing pipeline application 110, image data 112 captured by the array camera module 102, depth maps 114 generated by the image processing pipeline application from the captured image data, and/or higher resolution images 116 generated using super-resolution processes. The image processing pipeline application 110 is typically non-transitory machine readable instructions utilized to direct the processor to perform processes including (but not limited to) the various processes described below. In several embodiments, the processes include coordinating the capture of image data by groups of cameras within the array camera module 102, and the estimation of depth information 114 from the captured image data 112. In a number of embodiments, the image processing pipeline application 110 directs the processor 108 to synthesize higher resolution images 116 from the captured image data 112 using fusion and/o super-resolution processes. As discussed further below, the quality of the depth estimates and/or images generated by these processes is dependent upon the reliability of geometric calibration data 120 utilized to rectify the images. In many embodiments, the image processing pipeline application 110 directs the processor 108 to perform a dynamic calibration process utilizing image data captured by the cameras 104 in the array camera module 102.

With specific regard to the cameras 104 in the array camera module 102, each camera 104 in the array camera module 102 is capable of capturing an image of the scene. The sensor elements utilized in the focal planes of the cameras 104 can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In several embodiments, the sensor elements have different characteristics and, in many instances, the characteristics of the sensor elements are related to the color filter applied to each sensor element.

In a variety of embodiments, color filters in individual cameras can be used to pattern the camera module with π filter groups as further discussed in U.S. Patent Publication No. 2013/0293760 entitled "Camera Modules Patterned with pi Filter Groups" to Nisenzon et al, the disclosure from which related to filter patterns that can be utilized in the implementation of an array camera is incorporated by reference herein in its entirety. Any of a variety of color filter configurations can be utilized where cameras in each color channel are distributed on either side of the center of the camera. The cameras can be used to capture data with respect to different colors, or a specific portion of the spectrum. In a number of embodiments, cameras image in the near-IR, IR, and/or far-IR spectral bands.

In many embodiments, the lens stack within the optical channel of each camera has a field of view that focuses light so that pixels of each camera sample the same object space or region within the scene. In several embodiments, the lens stacks are configured so that the pixels that sample the same object space do so with sub-pixel offsets to provide sampling diversity that can be utilized to recover increased resolution through the use of super-resolution processes. The term sampling diversity refers to the fact that the images from different viewpoints sample the same object in the scene but with slight sub-pixel offsets. By processing the images with sub-pixel precision, additional information encoded due to the sub-pixel offsets can be recovered when compared to simply sampling the object space with a single image. In embodiments that recover higher resolution information, the lens stacks are designed to have a Modulation Transfer Function (MTF) that enables contrast to be resolved at a spatial frequency corresponding to the higher resolution and not at the spatial resolution of the pixels that form a focal plane.

With specific regard to the processor 108 illustrated in FIG. 1, processors utilized within camera arrays in accordance with many embodiments of the invention can be implemented using a microprocessor, a coprocessor, an application specific integrated circuit and/or an appropriately configured field programmable gate array that is directed using appropriate software to take the image data captured by the cameras within the array camera module 102 and perform dynamic calibration and/or image processing. In many embodiments of the invention, the process of estimating depth and/or synthesizing a higher resolution image of a scene from a set of images involves selection of a reference viewpoint, typically that of a reference camera. In many embodiments, the processor 108 is able to synthesize an image from a virtual viewpoint.

Although specific array camera architectures are described above with respect to FIG. 1, alternative architectures can also be utilized in accordance with embodiments of the invention. The use of image data captured by cameras in an array to perform dynamic calibration of the array is discussed further below.

Dynamic Calibration

Knowledge of the geometry of a camera array can be utilized to rectify images captured by the array. The transformations utilized during rectification processes are typically determined during an offline calibration process that yields what can be referred to as geometric calibration data. Appropriate offline calibration processes include offline calibration processes similar to those described in U.S. Pat. No. 9,124,864 entitled "Systems and Methods for Calibration of an Array Camera" to Mullis. The geometric calibration data is utilized in depth estimation processes, fusion processes, and/or super-resolution processes. Generally, the accuracy of depth estimates made by performing disparity searches with respect to images captured by a camera array degrades when the relative positions and orientations of the cameras within an array do not correspond to the geometry of the cameras when the offline calibration process was performed. The geometry of a camera array may change due to thermal expansion/contraction and/or environmental factors. Users of consumer electronic devices routinely drop the devices in ways that can deform the mechanical structures to which a camera array is mounted. Accordingly, camera arrays in accordance with a number of embodiments of the invention can perform processes that validate that available geometric calibration data is appropriate for the current geometry of a camera array. By detecting that the camera array is "out of calibration", another offline calibration process can be performed to obtain appropriate geometric calibration data. In several embodiments, the camera array is able to perform a dynamic calibration process that yields new geometric calibration data or updates to existing geometric calibration data to enable subsequent image processing operations to yield outputs that satisfy the requirements of a specific application.

Figure 2:
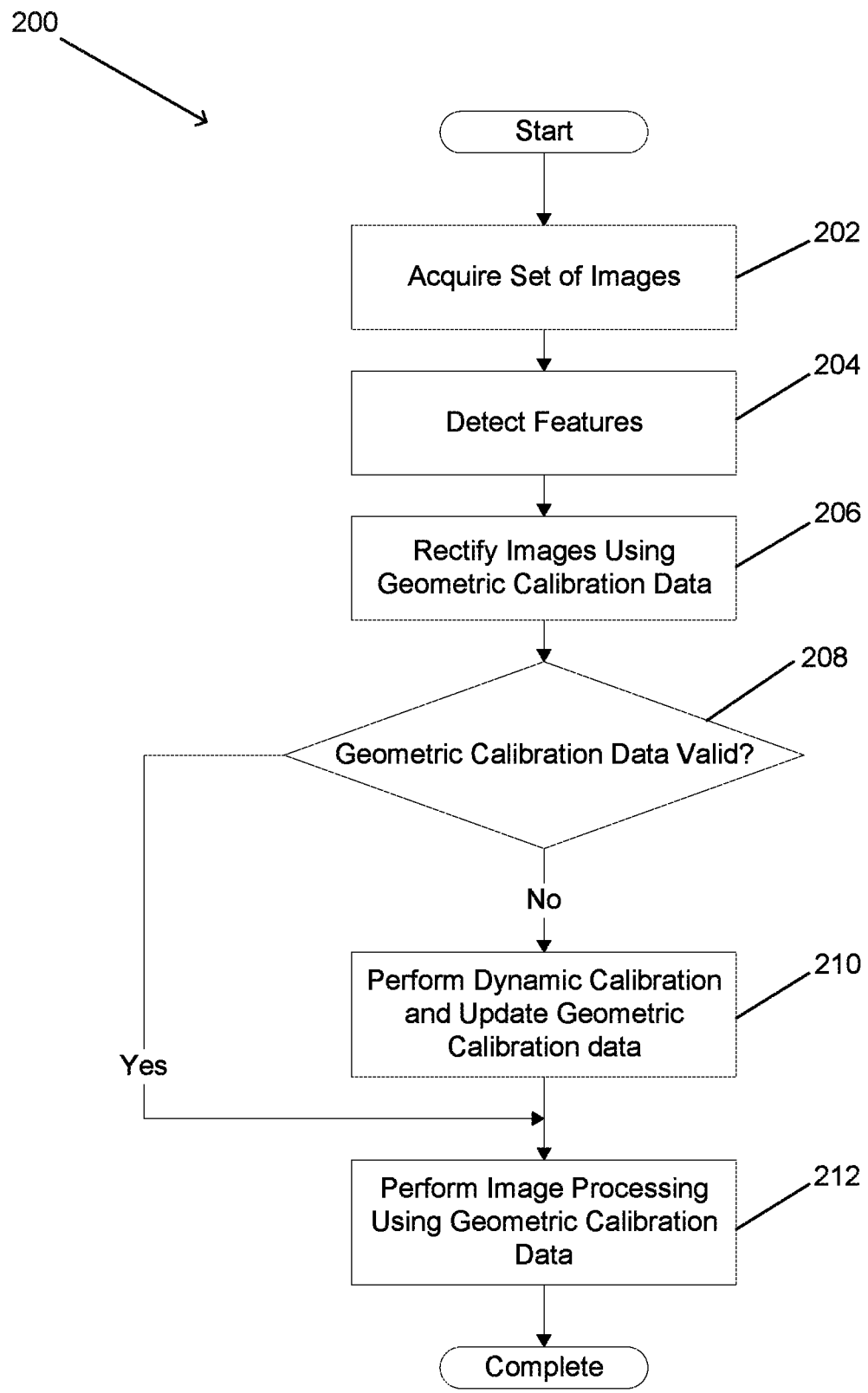
FIG. 2 is a flow chart illustrating a process for validating geometric calibration data and/or dynamically generating updated geometric calibration data in accordance with an embodiment of the invention.

A process for validating geometric calibration data and dynamically generating geometric calibration data in accordance with an embodiment of the invention is illustrated in FIG. 2. The process 200 involves acquiring (202) a set of images using an array of cameras. Feature detection processes are performed (204) with respect to each of the images to identify distinctive features within the scene that can be used to identify correspondence points within the set of images. Any of a variety of feature detectors can be utilized including (but not limited to) the Scale-Invariant Feature Transform (SIFT) detector, Speeded Up Robust Features (SURF) feature detector and/or any other feature detector that generates feature descriptors appropriate for identifying corresponding features between images in a set of images. While much of the discussion that follows relies upon the use of feature detection to identify correspondence between images, area based and/or correlation based correspondence analysis can also be performed to identify corresponding pixel locations within pairs of images and/or sets in accordance with a number of embodiments of the invention. Accordingly, feature detection can be used interchangeably with area based matching in any of the systems and/or methods described herein.

Figure 3B:
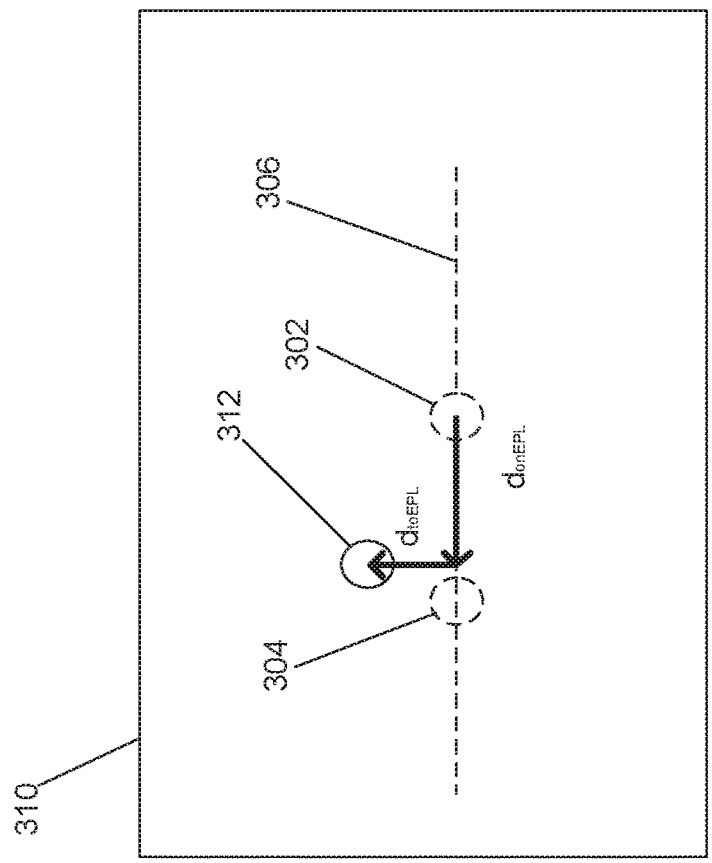
FIGS. 3A and 3B conceptually illustrate geometric shifts observed when geometric calibration data is valid and when a camera is out of calibration.
Figure 3A:
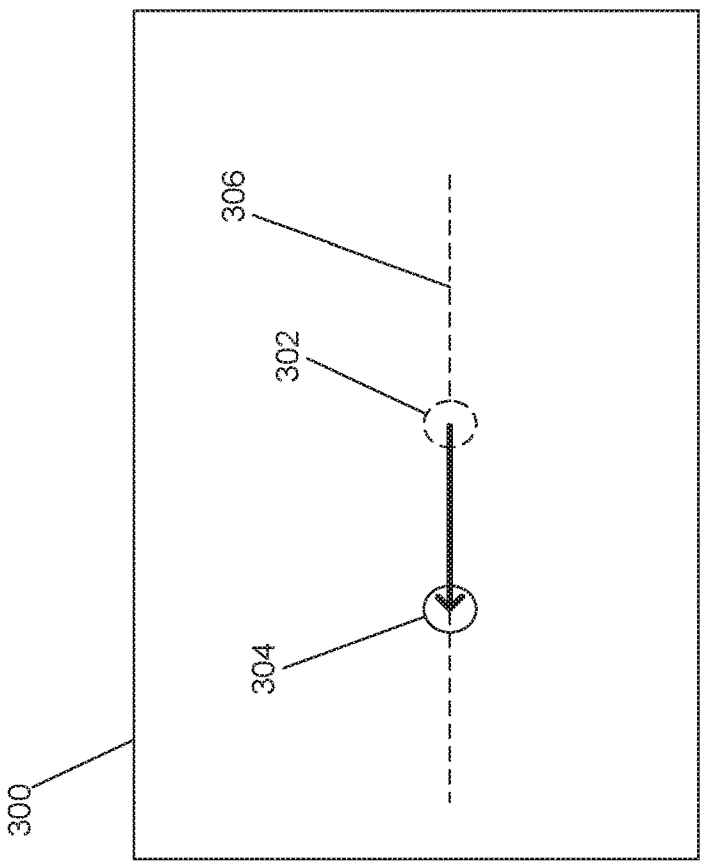

Geometric calibration data can then be utilized to rectify the captured set of images. When the geometric calibration data is valid for the geometry of the camera array, then features visible in a reference image will appear shifted a distance along an epipolar line determined by the distance of the feature from the reference camera. When the geometric calibration data is no longer valid for the geometry of the camera array, then corresponding features are likely to appear shifted to locations that do not lie upon epipolar lines. The difference is illustrated in FIGS. 3A and 3B. The image 300 includes a feature 302 visible in a reference camera that appears (304) shifted a distance along an epipolar line 306. As noted above, the extent of the shift is indicative of the distance of the feature from the reference camera. The fact that the feature 302 is shown in a location on or close to an epipolar line in the image 300 is suggestive that the geometry of the camera that captured the image and the reference camera corresponds to the relative orientation and alignment of the camera at the time the geometric calibration data was obtained. The reliability of the geometric calibration data can be confirmed by observing epipolar line shifts in other pairs of images that confirm the depth of the feature from the reference camera. In the event that the distance of the feature from the reference camera is not confirmed by the observed shifts in other images captured by the camera array, then the geometric calibration data is determined to be unreliable. An image captured by a camera in an array that no longer possesses the geometry it occupied during calibration is illustrated in FIG. 3B. The image 310 shows a feature 302 shifted (306) relative to its location in the image captured from the reference viewpoint. The observed shift is not in a direction along the epipolar line 306. The shift can be decomposed into a vector component along the epipolar line ($d_{onEPL}$) and a vector component perpendicular to the epipolar line or to the epipolar line ($d_{toEPL}$). As can readily be appreciated, the loss of calibration is likely to result in $d_{onEPL}$ being of a different magnitude than would be observed (304) were the geometric calibration data valid.

Referring again to FIG. 2, identification of corresponding features in rectified images can be used to determine (208) the validity of geometric calibration data. Where the magnitudes of $d_{toEPL}$ for one or more features is non-zero, then a determination can be made that the geometric calibration data is no longer valid. Any of a variety of criterion can be utilized to make the determination including (but not limited) to the normalized sum of the magnitudes of the $d_{toEPL}$ components of the shifts in corresponding feature points exceeding a threshold. As can readily be appreciated, the specific criterion or set of criteria utilized to determine that geometric calibration data is no longer valid can be determined based upon the requirements of a specific application.

When the corresponding feature points within the set of rectified images suggests that the geometric calibration data is no longer valid, then an alert can be provided to the user suggesting that the camera array be submitted for recalibration. In a number of embodiments, the camera array can perform (210) a dynamic calibration process using the identified feature points. The dynamic calibration process can yield a new set of geometric calibration data, a set of updates to the geometric calibration data generated through the offline geometric calibration process, and/or the selection of an alternative set of geometric calibration data from a database of sets of geometric calibration data. In several embodiments, databases of sets of geometric calibration data can be utilized that contain sets of geometric calibration data that are appropriate for different operating temperatures and/or different anticipated perturbations of cameras within the camera array. As can readily be appreciated, a database can be provided locally and/or remotely located and queried via a network connection. Specific processes for performing dynamic calibration in accordance with various embodiments of the invention are discussed in detail below. When a valid set of geometric calibration data is identified, the camera array can proceed (212) with acquiring additional sets of images and/or performing image processing using the geometric calibration data.

Although specific processes for determining the validity of a set of geometric calibration data for the geometry of a specific camera array and/or for performing dynamic calibration are discussed above with reference to FIG. 2, any of a variety of processes that utilize the locations of corresponding features in a set of rectified images to dynamically determine a set of geometric calibration data to use in image processing can be utilized as appropriate to the requirements of specific applications in accordance with various embodiments of the invention. Specific processes for dynamically generating new and/or updated geometric calibration data in accordance with a number of embodiments of the invention are discussed further below.

Dynamic Generation of Geometric Calibration Data

Offline processes for generating geometric calibration data rely on the ability to acquire images of a scene with known characteristics. Processes for dynamic generation of geometric calibration data typically do not possess any a priori knowledge of the characteristics of the scene. Feature detectors can enable an image processing application to determine corresponding features within a scene captured by the cameras in an array. These features are likely sparsely distributed. Therefore, the features do not directly enable the generation of geometric calibration information at each pixel location. However, interpolation and/or extrapolations of geometric calibration information at specific pixel locations can be utilized to generate a new set of geometric calibration data, and/or a set of updates for an existing set of geometric calibration data. In a number of embodiments, the geometric calibration data determined at the pixel locations of the features is matched to identify a set of geometric calibration that provides the best fit for the observed correspondences from a database containing sets of geometric calibration data.

Figure 4:
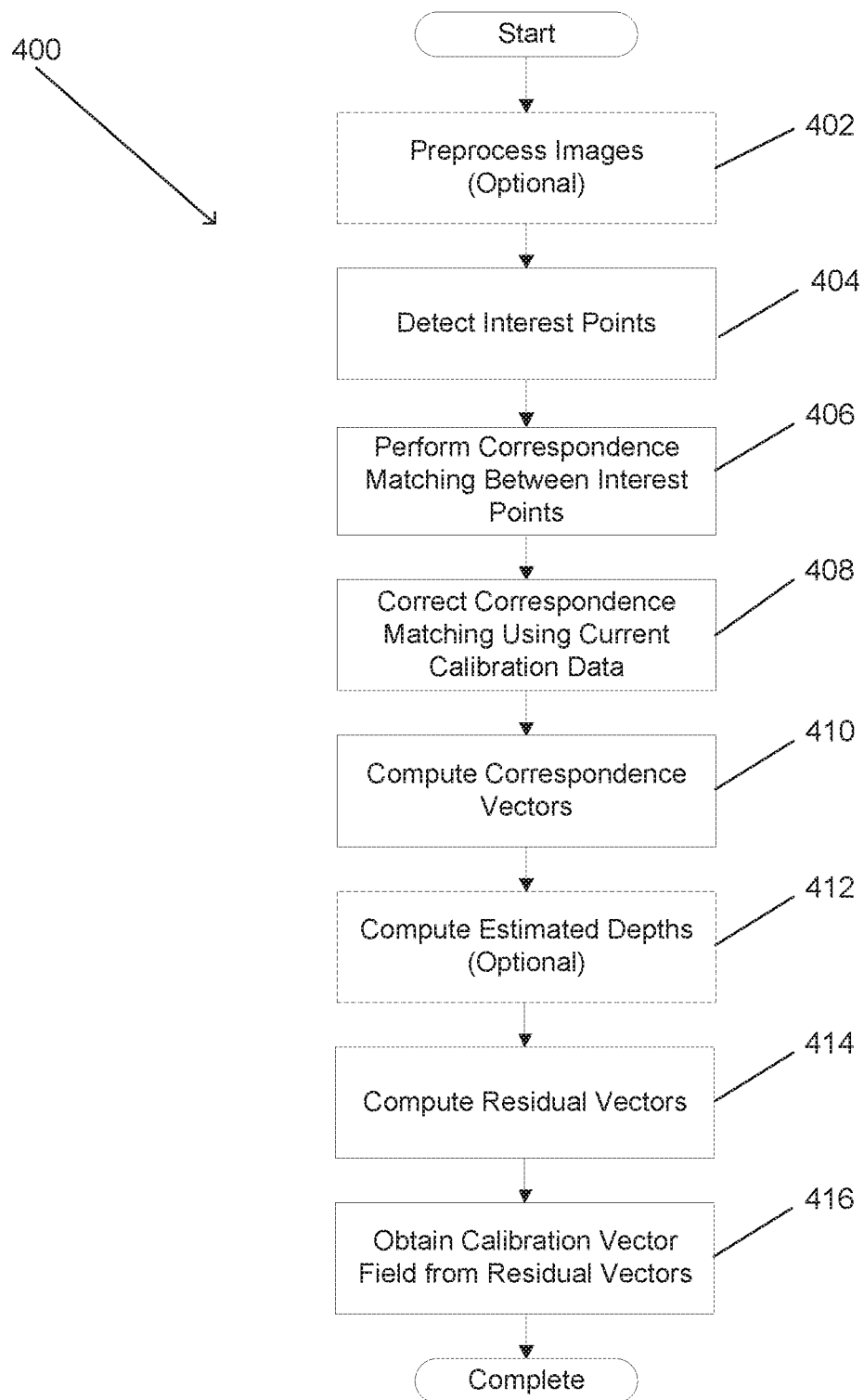
FIG. 4 is a flow chart illustrating a process for performing dynamic geometric calibration in accordance with an embodiment of the invention.

A process for performing dynamic calibration to obtain a set of geometric calibration data based upon a set of observed features within a scene in accordance with an embodiment of the invention is illustrated in FIG. 4. The process 400 includes (optionally) preprocessing (402) the images to increase the correspondence between images captured in different color channels. In several embodiments, preprocessing involves the use of a correlation transform to align small image patches. In several embodiments, a correlation transform can be utilized similar to the transform described in Drulea, M.; Nedevschi, S., "Motion Estimation Using the Correlation Transform," in *Image Processing, IEEE Transactions on*, vol. 22, no. 8, pp. 3260-3270, August 2013, the relevant disclosure of which is hereby incorporated by reference in its entirety. Where all of the cameras in a camera array capture image data in the same image spectral band, preprocessing may not be necessary.

A feature detector can be used to detect (404) features and/or points of interest in the set of images. As noted above, any of a variety of feature detectors including SIFT and/or SURF detectors can be utilized to detect features as appropriate to the requirements of a specific application. Correspondence matching is then performed (406) between the feature points visible in a reference image and feature points visible in other images within the set of images captured by the camera array. In many embodiments, a sparse optical flow process such as (but not limited to) the Lucas-Kanade method can be utilized to determine feature correspondence. Sparse optical flow processes assume that the optical flow between a pair of images is essentially constant in a local neighborhood of the pixel under consideration, and solve the basic optical flow equations for all the pixels in that neighborhood by a criterion such as (but not limited to) the least squares criterion. The correspondence problem is a well known problem in the field of computer vision and any of a variety of alternative correspondence matching processes including (but not limited to) a Random Sample Consensus (RANSAC) process can be utilized to identify corresponding features within image pairs and/or sets of images as appropriate to the requirements of specific applications.

The best available geometric calibration data can then be utilized to apply (408) geometric shifts to the locations of the corresponding features. In theory, these shifts should rectify the images. As noted above, the geometric shifts will be unsuccessful in rectifying the images when the geometry of the camera array differs from that assumed by the geometric calibration data. The effectiveness of the geometric calibration data in rectifying the images can be determined by calculating (410) the vector difference ($d_{onEPL}$, $d_{toEPL}$) for each of the corresponding features between the reference image and an alternate view image (i.e. an image captured from a different viewpoint/camera to the viewpoint/camera from which the reference image was captured). As noted above, the $d_{toEPL}$ components of the vectors should be zero or near-zero when the geometry of the camera array corresponds to the geometry assumed by the geometric calibration data.

The shifts that are observed between corresponding pixels in a reference image and an alternate view image include scene independent shifts and scene dependent shifts. The scene independent shifts are a function of the geometry of the camera array and variations in the components used to construct the cameras. The scene dependent shifts are introduced based upon the distance of objects within the scene. In order to dynamically generate calibration data, processes in accordance with many embodiments of the system attempt to correct for scene dependent shifts in order to determine the residual error in geometric calibration data.

In several embodiments, the camera array prompts the user via a user interface to capture the set of images used to dynamically calibrate the camera array by capturing a set of images of a scene in which all objects within the scene are sufficiently distant from the camera so that the entire scene can be assumed to be at infinity. When the scene can be assumed to be at infinity, then the scene dependent shifts that are present within the image should be zero at all pixel locations. To the extent that there are shifts, these are corrected through rectification.

Where objects are located within a scene at unknown depths, the shifts present in the image include scene dependent geometric shifts and scene independent geometric shifts. In order to update the geometric calibration data to correct for the scene independent shifts, the scene dependent geometric shifts are estimated and removed. A separate depth estimate is determined (412) for each feature using the weighted average of the observed shifts along the epipolar lines ($d_{onEPL}$) in each of the alternate view images, where the average is weighted by assumed baselines between the cameras that captured the reference image and the alternate view images. In other embodiments, scene dependent shifts can be determined using any of a variety of processes for estimating the depths of observed features. As can readily be appreciated, the number of cameras utilized to capture images within the set of images and the number of features within the captured images can significantly increase the precision with which scene dependent geometric corrections can be removed during dynamic calibration processes.

In embodiments in which scene dependent geometric shifts are estimated, the scene dependent geometric shifts are subtracted from the vector difference ($d_{onEPL}$, $d_{toEPL}$) for each of the corresponding features between the reference image and an alternate view image to compute (414) residual vectors ($r_{onEPL}$, $r_{toEPL}$) for each corresponding feature visible within the alternate view image. The residual vectors can then be utilized to compute (416) corrections to the vector field of the geometric calibration data (i.e. corrections to apply to the geometric calibration vectors specified for each pixel location of the camera that captured the alternate view image). In several embodiments, the corrections to the vector field of the geometric calibration data are determined by converting the residual vector points to pixel coordinates within the alternate view image and then residual vectors for pixel locations for which residual vectors are not specified can be determined using interpolation, extrapolation, and/or filtering of the known residual vectors. The resulting residual calibration vector field can be applied to adjust the geometric calibration data at each pixel location of the alternate view camera to correct for the scene independent geometric shifts observed within images captured by the alternate view camera relative to images captured by the reference camera. In this way, the process 400 is capable of dynamically generating updated geometric calibration data appropriate to the current geometry of the camera array.

In many embodiments, the residual calibration vector field generated using processes similar to those described above with reference to FIG. 4 are noisy. In a number of embodiments, a set of basis vectors is learned from a training dataset of residual calibration vector fields. The residual calibration vector fields can be considered to span a state space representing possible observed residual calibration vector fields associated with various alterations in the geometry of the camera array (both intrinsic and extrinsic as discussed above). The basis vectors can be utilized during dynamic calibration to denoise a residual calibration vector field by mapping the residual calibration vector field to the basis vectors and generating a denoised residual calibration vector field as a linear combination of a reduced number of the basis vectors selected to reduce the presence of random noise within the residual calibration vector field. In several embodiments, the basis vectors are learned using Principal Component Analysis (PCA). PCA can be used to construct a basis having the property that it minimizes the reconstruction error when the expansion is truncated to a smaller number of basis vectors. Thus truncation can be an effective technique for reducing noise. The specific mechanism used to select the reduced basis for denoising the residual calibration vector field is largely dependent upon the requirements of a given application. Furthermore, any of a variety of processes can be utilized to select basis vectors and/or to denoise residual calibration vector fields in accordance with embodiments of the invention.

Although specific processes for generating updated geometric calibration data are described above with reference to FIG. 4, any of a variety of processes can be utilized to generate updated calibration data based upon observed shifts of features and/or correlated image patches accounting for scene dependent geometric shifts as appropriate to the requirements of specific applications in accordance with embodiments of the invention. In addition, processes similar to the process described above with respect to FIG. 4 can be utilized to dynamically generate geometric calibration data in the absence of a previously generated set of geometric calibration data. Instead of generating a residual vector field, the process illustrated in FIG. 4 can be utilized to generate a complete geometric calibration vector field based upon the interpolation and/or extrapolation of the observed scene independent shifts of corresponding features in the set of captured images.

Combining Dynamic Calibration Data

Real world scenes typically contain reliable features that are strong enough to be tracked across images captured by multiple cameras in an array in random locations. In addition, features are often clustered within certain regions within the field of view of a reference camera and other regions can be relatively devoid of features. The density and distribution of features can impact the errors introduced by the interpolation and extrapolation processes utilized to generate residual calibration vector fields. Extrapolation, in particular, can introduce a great deal of noise in depth estimates and/or super-resolution processes. In a number of embodiments, different regions of a residual calibration vector field for a camera are constructed using residual vectors determined based upon the use of different cameras within the array as reference cameras and/or using multiple sets of images captured of different scenes. In certain embodiments, the processes of obtaining multiple sets of images of different scenes is guided by the array camera. The array camera can identify a region of a scene within the field of view of the reference camera and instruct a user to reorient the camera array so that the feature rich portion of the scene appears within different regions of the field of view of the reference camera until a set of images in which a threshold density of features has been obtained with respect to each region within the field of view of the reference camera.

Figure 5:
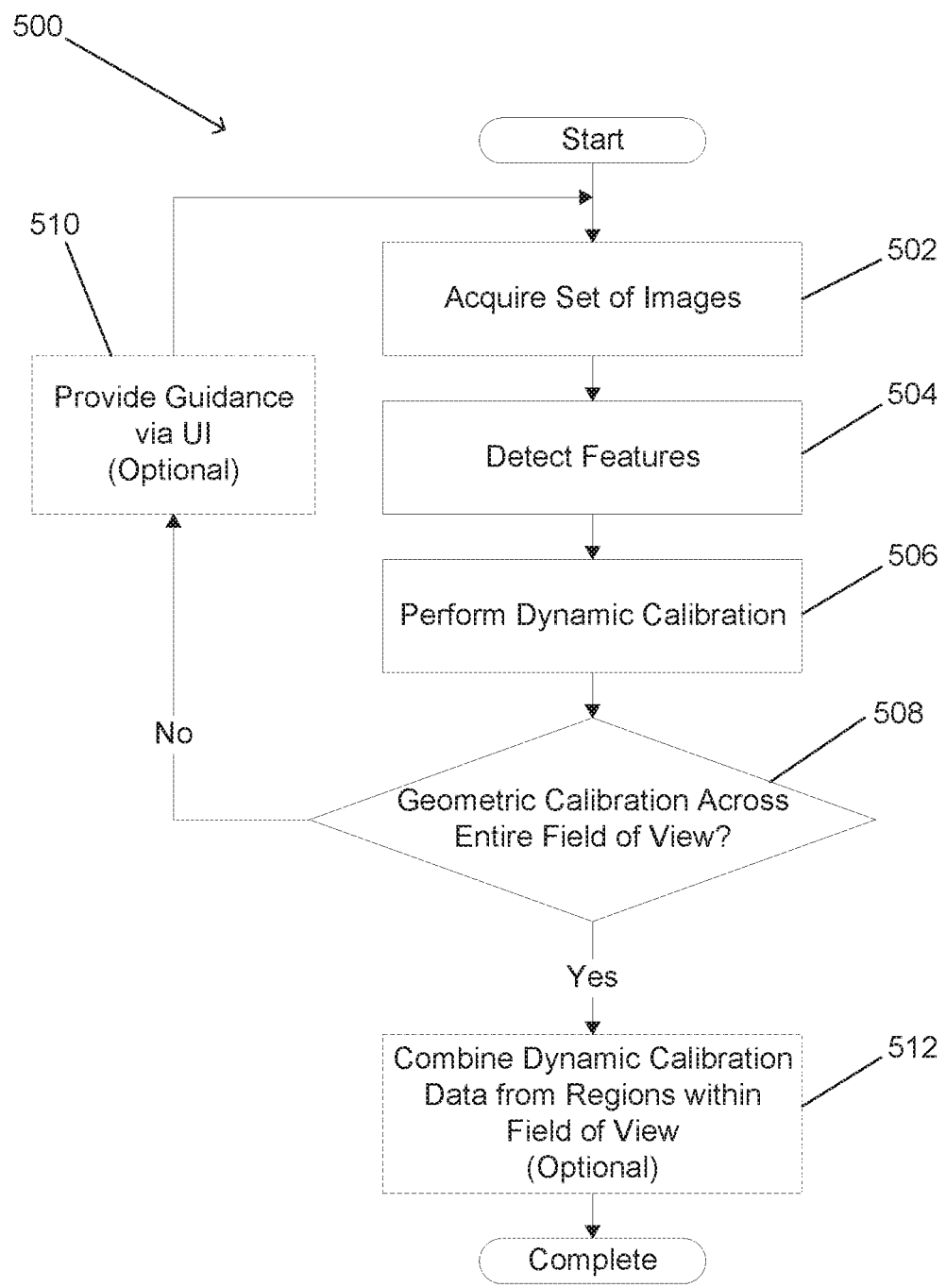
FIG. 5 is a flow chart illustrating a process for combining dynamically generated geometric calibration data with respect to different regions of a camera's field of view to produce a complete set of updated geometric calibration data with respect to the entire field of view of a camera in accordance with an embodiment of the invention.

A process for combining residual vectors determined using different sets of images to obtain a residual calibration vector field in accordance with an embodiment of the invention is illustrated in FIG. 5. The process 500 includes acquiring (502) a set of images and detecting (504) features within the set of images using techniques similar to those described above. The features can then be utilized to perform dynamic calibration. The density of features within the field of view of the reference camera can be utilized to identify regions within the field of view that contain an insufficient density of features (e.g. fail a feature density threshold) and/or regions that exceed the minimum feature density. Where the entire field of view of the reference camera is feature rich, the process completes. Otherwise, the process 600 involves capturing (502) additional sets of images. In several embodiments, the array camera includes a user interface and provides direction to the user concerning the manner in which to reorient the camera array so that features present within the scene move within portions of the field of view in which updated calibration data is still required. The acquisition (502) of sets of images and determination (506) of residual vectors continues until the combined residual vectors achieve a threshold density of residual vectors for each camera. At which point, the residual vectors can be combined (512) and utilized to generate a residual calibration vector field.

Although specific processes are describe above with reference to FIG. 5, any of a variety of processes can be utilized to combine various sources of residual vector information to generate a residual calibration vector field for use in subsequent image processing operations as appropriate to the requirements of specific applications in accordance with various embodiments of the invention. In other embodiments, residual calibration vector fields can be generated with respect to each of the sets of images and the residual calibration vector fields combined. While many of the processes described above utilize interpolation and extrapolation in the generation of geometric calibration data and/or residual calibration vector fields that can be utilized to update geometric calibration data, residual vectors and/or residual calibration vector fields generated using techniques similar to those described above can be utilized to select an appropriate set of geometric calibration data from amongst a number of different sets of geometric calibration data. Processes for choosing between alternative sets of geometric calibration data using dynamic calibration in accordance with various embodiments of the invention are discussed further below.

Choosing Between Sets of Geometric Calibration Data

The sparse nature of the features used to identify correspondences between images captured by a camera array necessitate the use of interpolation and extrapolation to convert residual vectors into residual calibration vector fields that can be used to update geometric calibration data at each pixel location of an alternate view camera. By their nature, the interpolation and extrapolation processes introduce errors into the resulting geometric calibration data. An alternative to using the residual vectors to generate a residual calibration vector field is to use the residual vectors to choose a best fit from amongst a number of alternative geometric calibration datasets. In several embodiments, correspondence of features is determined using each of a number of different geometric calibration data sets and the geometric calibration set that yields the smallest average residual vectors is utilized for subsequent image processing.

Figure 6:
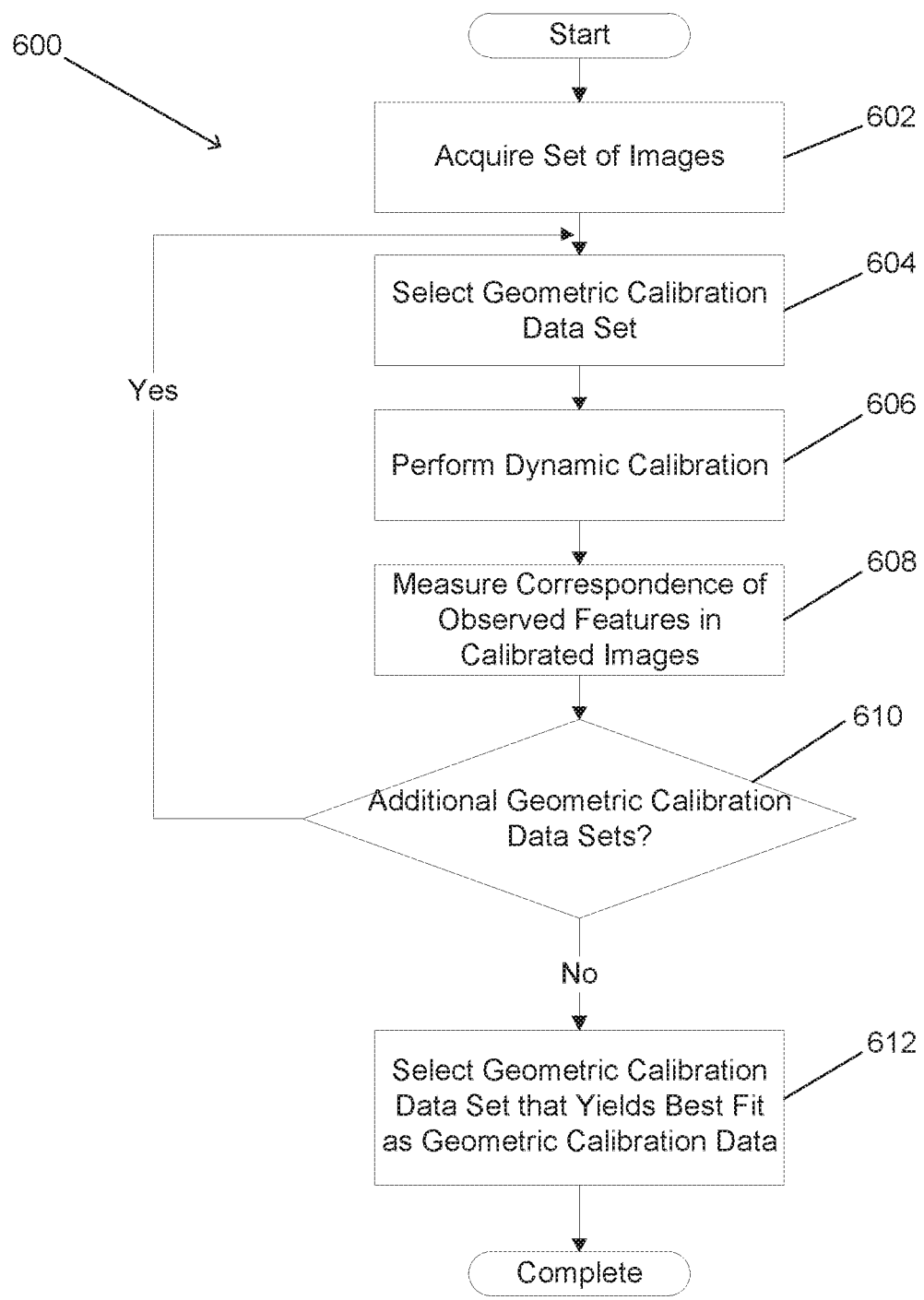
FIG. 6 is a flow chart illustrating a process for dynamically updating geometric calibration data by selecting a set of geometric calibration data that is a best fit for observed shifts of corresponding features within a set of images in accordance with an embodiment of the invention.

A process for selecting a set of geometric calibration data from amongst a number of sets of geometric calibration data in accordance with an embodiment of the invention is illustrated in FIG. 6. The process 600 includes acquiring a set of images (602) using a camera array and selecting (604) a first set of geometric calibration data. The process proceeds in a similar manner to the dynamic calibration processes describe above. Dynamic calibration is performed (606) to obtain residual vectors for each of a set of corresponding feature points and the residual vectors are utilized to measure the extent to which the observed shifts following rectification based upon the geometric calibration data correspond to the anticipated scene dependent geometric shifts. Any of a variety of metrics can be utilized to evaluate the extent to which the geometric calibration data fits the observed shifts including (but not limited) the average magnitude of the residual vectors. The process of selecting (604) geometric calibration data sets, performing (606) dynamic calibration using the selected geometric calibration data, and measuring the extent to which the geometric calibration data fits the shifts observed between corresponding feature points repeats until each set of geometric calibration data has been considered (610). As can readily be appreciated, any of a variety of different sets of geometric calibration data can be considered including different sets corresponding to geometric calibration data appropriate for different operating temperatures within a predetermined temperature range. The specific sets of geometric calibration data considered are typically determined based upon the requirements of a specific camera array application. When all of the geometric calibration data sets have been considered, the geometric calibration data that is the best fit for the shifts observed between corresponding feature points can be utilized for subsequent image processing.

Although specific processes are described above with reference to FIG. 6, any of a variety of processes can be utilized to select a set of geometric calibration data from amongst a number of sets of geometric calibration data that is the best fit for shifts observed between corresponding feature points. In addition, the process illustrated in FIG. 6 involves a loop. As can readily be appreciated, processes can be implemented that evaluate multiple set of geometric calibration data in parallel. In a number of embodiments, a set of images is provided by a camera array to a remotely located server system that evaluates the set of images against a database of geometric calibration data and returns an updated set of geometric calibration data via a network connection to the camera array.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of dynamically generating geometric calibration data for an array of cameras, comprising:
    acquiring a set of images of a scene using a plurality of cameras, wherein different cameras have different imaging characteristics, where the set of images comprises a reference image and an alternate view image;
    detecting features in the set of images using a processor directed by an image processing application;
    identifying within the alternate view image features corresponding to features detected within the reference image using a processor directed by an image processing application;
    rectifying the set of images based upon a set of geometric calibration data using a processor directed by an image processing application;
    determining residual vectors for geometric calibration data at locations where features are observed within the alternate view image based upon observed shifts in locations of features identified as corresponding in the reference image and the alternate view image using a processor directed by an image processing application; wherein determining residual vectors for geometric calibration data at locations where features are observed within the alternate view image comprises estimating depths of features within the alternate view image identified as corresponding to features detected within the reference image based upon components of the observed shifts in locations of features identified as corresponding in the reference image and the alternate view image along a plurality of epipolar lines;
    determining updated geometric calibration data for a camera that captured the alternate view image based upon the residual vectors using a processor directed by an image processing application;
    rectifying an image captured by the camera that captured the alternate view image based upon the updated geometric calibration data using a processor directed by an image processing application; and
    mapping the residual vector calibration field to a set of basis vectors; and generating a denoised residual vector calibration field using a linear combination of less than the complete set of basis vectors;
    wherein determining updated geometric calibration data for a camera that captured the alternate view image based upon the residual vectors comprises using at least an interpolation process to generate a residual vector calibration field from the residual vectors.

2. The method of claim 1, wherein determining residual vectors for geometric calibration data at locations where features are observed within the alternate view image comprises:
    determining scene dependent geometric corrections to apply to the observed shifts in locations of features identified as corresponding in the reference image and the alternate view image based upon the estimated depths of the corresponding features; and
    applying the scene dependent geometric corrections to the observed shifts in locations of features identified as corresponding in the reference image and the alternate view image to obtain residual vectors for geometric calibration data at locations where features are observed within the alternate view image.

3. The method of claim 1, wherein determining updated geometric calibration data for a camera that captured the alternate view image based upon the residual vectors further comprises using an extrapolation process in the generation of the residual vector calibration field from the residual vectors.

4. The method of claim 1, further comprising applying the residual vector calibration field to the set of geometric calibration data with respect to the camera that captured the alternate view image.

5. The method of claim 1, wherein the set of basis vectors is learned from a training data set of residual vector calibration fields.

6. The method of claim 5, wherein the set of basis vectors is learned from a training data set of residual vector calibration fields using Principal Component Analysis.

7. The method of claim 1, wherein determining updated geometric calibration data for a camera that captured the alternate view image further comprises selecting an updated set of geometric calibration data from amongst a plurality of sets of geometric calibration data based upon at least the residual vectors for geometric calibration data at locations where features are observed within the alternate view image.

8. The method of claim 1, further comprising:
acquiring an additional set of images of a scene using the plurality of cameras; and
determining residual vectors for the geometric calibration data using the
additional set of images;
wherein determining updated geometric calibration data for a camera that captured the alternate view image based upon the residual vectors also comprises utilizing the residual vectors for the geometric calibration data determined using the additional set of images.

9. The method of claim 8, further comprising:
detecting at least one region within a field of view of a camera that does not satisfy a feature density threshold;
wherein the additional set of images of a scene is acquired in response to detecting that at least one region within a field of view of a camera does not satisfy the feature density threshold.

10. The method of claim 9, wherein utilizing the residual vectors determined using the additional set of images further comprises utilizing the residual vectors determined using the additional set of images to determine updated geometric calibration data with respect to the at least one region within the field of view of the camera in which the density threshold was not satisfied.

11. The method of claim 10, further comprising providing prompts via a user interface using a processor directed by an image processing application, where the prompts direct orientation of the camera array to shift locations of features identified as corresponding in the reference image and the alternate view image into the at least one region within the field of view of a camera that does not satisfy a feature density threshold during acquisition of the additional set of images.

12. A method of validating geometric calibration data for an array of cameras, comprising:
acquiring a set of images of a scene using a plurality of cameras, wherein different cameras have different imaging characteristics, where the set of images comprises a reference image and an alternate view image;
detecting features in the set of images using a processor directed by an image processing application;
identifying within the alternate view image features corresponding to features detected within the reference image using a processor directed by an image processing application;
rectifying the set of images based upon a set of geometric calibration data using a processor directed by an image processing application; and
determining the validity of the geometric calibration data based upon observed shifts in locations of features identified as corresponding in the reference image and the alternate view image using a processor directed by an image processing application;
dynamically generating updated geometric calibration data by:
determining residual vectors for geometric calibration data at locations where features are observed within the alternate view image based upon the observed shifts in locations of features identified as corresponding in the reference image and the alternate view image using a processor directed by an image processing application; and
determining updated geometric calibration data for a camera that captured the alternate view image based upon the residual vectors using a processor directed by an image processing application;
wherein determining updated geometric calibration data for a camera that captured the alternative view image based upon the residual vectors comprises using at least an interpolation process to generate a residual vector calibration field from the residual vectors;
mapping the residual vector calibration field to a set of basis vectors; and
generating a denoised residual vector calibration field using a linear combination of less than the complete set of basis vectors;
wherein determining residual vectors for geometric calibration data at locations where features are observed within the alternate view image comprises: estimating depths of features within the alternate view image identified as corresponding to features detected within the reference image based upon components of the observed shifts in locations of features identified as corresponding in the reference image and the alternate view image along epipolar lines using a processor directed by an image processing application.

13. The method of claim 12, wherein determining the validity of the geometric calibration data based upon observed shifts in locations of features identified as corresponding in the reference image and the alternate view image comprises determining the extent to which observed shifts are to locations distant from an epipolar line.

14. The method of claim 12, wherein determining residual vectors for geometric calibration data at locations where features are observed within the alternate view image comprises:
determining scene dependent geometric corrections to apply to the observed shifts in locations of features identified as corresponding in the reference image and the alternate view image based upon the estimated depths of the corresponding features; and
applying the scene dependent geometric corrections to the observed shifts in locations of features identified as corresponding in the reference image and the alternate view image to obtain residual vectors for geometric calibration data at locations where features are observed within the alternate view image.

15. The method of claim 12, wherein determining updated geometric calibration data for a camera that captured the alternate view image further comprises selecting an updated set of geometric calibration data from amongst a plurality of sets of geometric calibration data based upon at least the residual vectors for geometric calibration data at locations where features are observed within the alternate view image.

16. The method of claim 12, further comprising: acquiring an additional set of images of a scene using the plurality of cameras; and determining residual vectors using the additional set of images;

wherein determining updated geometric calibration data for a camera that captured the alternate view image based upon the residual vectors also comprises utilizing the residual vectors determined using the additional set of images.

* * * * *